United States Patent
Bloch et al.

(10) Patent No.: US 8,322,888 B2
(45) Date of Patent: Dec. 4, 2012

(54) THROUGH-THE-LENS ILLUMINATOR FOR OPTICAL COMPARATOR

(75) Inventors: Stephanie M. Bloch, Rush, NY (US); David E. Lawson, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 0 days.

(21) Appl. No.: 13/532,220

(22) Filed: Jun. 25, 2012

(65) Prior Publication Data
US 2012/0262707 A1    Oct. 18, 2012

Related U.S. Application Data

(62) Division of application No. 12/948,903, filed on Nov. 18, 2010, now Pat. No. 8,248,591.

(51) Int. Cl.
*F21V 5/04* (2006.01)
(52) U.S. Cl. ............ 362/268; 362/19; 362/339
(58) Field of Classification Search ......... 362/19, 362/268, 253, 339
See application file for complete search history.

(56) References Cited

U.S. PATENT DOCUMENTS

| | | | |
|---|---|---|---|
| 6,974,215 B2 | 12/2005 | Hayashi | |
| 7,173,694 B2 * | 2/2007 | Goldberg et al. | 356/237.4 |
| 7,283,223 B2 * | 10/2007 | Fritz | 356/218 |
| 7,725,024 B2 | 5/2010 | Baldwin et al. | |
| 7,859,646 B2 | 12/2010 | Bentley | |
| 7,901,096 B2 | 3/2011 | Klepp | |
| 2003/0169421 A1 | 9/2003 | Ehbets | |
| 2003/0176987 A1 * | 9/2003 | Nakajima | 702/159 |
| 2005/0099814 A1 * | 5/2005 | Kohno | 362/268 |
| 2007/0019186 A1 | 1/2007 | Sung et al. | |
| 2008/0024794 A1 | 1/2008 | Miyazaki et al. | |
| 2009/0073695 A1 * | 3/2009 | Shimamoto | 362/268 |
| 2009/0109285 A1 | 4/2009 | Tobiason et al. | |
| 2009/0153860 A1 | 6/2009 | Bloch et al. | |
| 2010/0148083 A1 | 6/2010 | Brown et al. | |

OTHER PUBLICATIONS

PCT—Notification of Transmittal of the International Search Report and the Written Opinion of the International Searching Authority, or the Declaration; dated Apr. 10, 2012 (2 pages) (in corresponding PCT International Application No. PCT/US2011/057694).
PCT—International Search Report; dated Apr. 10, 2012 (3 pages) (in corresponding PCT International Application No. PCT/US2011/057694).
PCT—Written Opinion of the International Searching Authority; dated Apr. 10, 2012 (4 pages) (in corresponding PCT International Application No. PCT/US2011/057694).

* cited by examiner

*Primary Examiner* — Hoa Pham
(74) *Attorney, Agent, or Firm* — Stephen B. Salai, Esq.; Thomas B. Ryan; Harter Secrest & Emery LLP

(57) ABSTRACT

An illumination system shares portions of an objective of an optical inspection system. A plurality of beam-shaping optics collects light from a plurality of effective light sources and directs the light through a portion of the objective for illuminating an object under inspection. The objective includes a front relay lens, a rear relay lens, and an objective stop disposed between the front and rear relay lenses for collecting light scattered from the object and forming an image of the object with the collected light. The beam-shaping optics, which surround the objective stop, are arranged together with the associated effective light sources for non-uniformly distributing light within a range of angles required for illuminating the object.

10 Claims, 4 Drawing Sheets ns from the beam-shaping optics are preferably arranged for more efficiently conveying generated light to the object under inspection and for more uniformly distributing the light over the object field.

THROUGH-THE-LENS ILLUMINATOR FOR OPTICAL COMPARATOR

CROSS-REFERENCE TO RELATED APPLICATION

This application is a division of U.S. patent application Ser. No. 12/948,903, filed Nov. 18, 2010, now U.S. Pat. No. 8,248,591, which application is hereby incorporated by reference.

TECHNICAL FIELD

The invention arises within the field of metrology as an improvement to illumination systems for optical comparators and relates particularly to illumination systems that share optical paths with imaging systems of optical inspection machines.

BACKGROUND OF THE INVENTION

Optical comparators project images of objects under inspection onto display screens for comparison against a reference datum. Comparisons to the reference datum can be made in association with different types of illumination, including direct lighting, back lighting, and oblique lighting of the objects.

The comparators include optical imaging systems responsible for projecting the images of objects under inspection onto display screens. Objectives can be used to form intermediate images of the objects, and the intermediate images can be magnified by projectors for producing display images capable of comparison to the reference datum.

So called "through-the-lens" illuminating systems have been used for illuminating the objects under inspection by directing light through the objectives to the objects. The illuminating light is generally produced by light sources located remote from the optical imaging systems but producing light beams that generally intersect light paths through the optical imaging system. Inclined mirrors of such illuminating systems surrounding aperture stops of the illuminating systems fold the illuminating beams into alignment with the light paths of the imaging systems.

Light sources of the type used for such illuminating systems, such as mercury arc lamps, tend to be large and expensive, and can raise safety concerns. Some countries, for example, have banned mercury arc lamps. The invention includes among its objects the replacement of such large light sources while providing through-the-lens illumination of objects under inspection.

SUMMARY OF THE INVENTION

The invention, as may be practiced within certain preferred embodiments of through-the-lens illumination systems, replaces large single light sources located remote from the shared pathways of coextending portions of imaging systems with a plurality of smaller light sources and associated beam-shaping optics located coaxially with the shared pathways. The plurality of light sources can include light-emitting diodes (LEDs) whose output is shaped by the beam-shaping optics for filling portions of an effective illuminator aperture surrounding an aperture stop of an objective of the imaging system. Although propagating in opposite directions, both the imaging light filling the objective stop and the illuminating light filling portions of a surrounding space can pass through a common optical element of the objective for directing light both to and from an object under inspection. Light distribu- One example of an optical inspection system arranged in accordance with the invention includes both an illuminating system for illuminating an object under inspection and an imaging system for imaging the object under inspection within an object field. An objective is shared in part by both the illuminating system and the imaging system and includes a front relay lens, a rear relay lens, and an objective stop disposed between the front and rear relay lenses. The objective, which is preferably at least approximately telecentric, collects light scattered from the object and forms an image of the object with the collected light. The image can be a final image but is preferably in intermediate image that is projected onto a comparator screen. A multiplexed beam generator of the illuminating system includes a plurality of effective light sources and associated beam-shaping optics surrounding the objective stop for illuminating the object. Each of the beam-shaping optics is arranged together with its associated effective light source for non-uniformly distributing light within a range of angles required for illuminating the object field.

Each of the beam-shaping optics and its associated effective light source is preferably arranged for distributing light differently within the range of required angles so that the object field is more efficiently and uniformly illuminated. For example, the beam-shaping optics can be distributed in pairs symmetrically about an optical axis of the objective and the non-uniform distributions of light within the pairs can be substantially mirror symmetrical. The range of angles through which light is distributed from the beam-shaping optics can include angles at which the light both converges toward and diverges from an optical axis of the objective and the beam-shaping optics preferably distribute more light into the angles that converge toward the optical axis.

The effective light sources are preferably relatively sized for producing together with the beam-shaping optics a limited range of angularly related light beams that are converted by the front relay lens into a range of spatially distributed beams over the object field. The beam-shaping optics include optical axes, and in one arrangement, the associated effective light sources can have centers that are offset from the optical axes of the beam-shaping optics. Preferably, the centers of the effective light sources are offset from the optical axes of the beam-shaping optics in directions that extend radially of an optical axis of the objective.

In another arrangement, the beam-shaping optics include optical axes that are inclined to an optical axis of the objective. The axes of the beam-shaping optics are preferably inclined in axial planes containing the axis of the objective.

For cost considerations, the relay lenses of the objective preferably have a limited size. The numerical aperture of the objective through the front relay lens is preferably limited by the objective stop in accordance with the general requirements for approaching telecentricity. The illumination system operates through the front relay lens of the objective at a higher numerical aperture, and as such, only the illuminating light closest radially to the objective stop approaches the object field as near telecentric light. Illuminating light farther radially from the objective stop progressively departs from telecentricity. For example, an aperture of the front relay lens can block angles that would otherwise have contributed to more telecentric illumination.

In another arrangement, the beam-shaping optics can have peripheries that are truncated adjacent to the objective stop. The optical axes of the beam-shaping optics are positioned closer to the objective stop through radial distances that approximately correspond to amounts that the peripheries of the beam-shaping optics are truncated in common radial directions. With the illuminating light concentrated closer radially to the objective stop, angular uniformity at the object field can be increased along with spatial uniformity and overall efficiency. Spatial uniformity can be increased at some cost to angular uniformity by increasing the distribution of light among certain of the angles that converge toward the optical axis of the objective.

An illumination system in accordance with another example of the invention is particularly adapted for use with an optical inspection system having an objective for forming an image of an object under inspection. A plurality of effective light sources and associated beam-shaping optics are arranged for collecting light from the plurality of light sources and directing the light through a portion of the objective for illuminating the object. A common housing for the beam-shaping optics has a central aperture about which the beam-shaping optics are mounted and within which a stop of the objective is defined. An optically transmissive plate located within the central aperture of the common housing blocks transmissions of heat through the objective stop.

Locating the plurality of effective light sources proximate to the imaging pathway can produce heat disturbances within the imaging system (e.g., heat waves) particularly if one or the other of the relay lenses is located along a convection pathway. Locating the optically transmissive plate within the central aperture of the common housing blocks the propagation of heat along the imaging pathway. The optically transmissive plate is preferably inclined out of a normal orientation to an optical axis of the imaging system to avoid producing spurious images of the object. A seal between the optically transmissive plate and the common housing prevents even minor air flow through the housing's central aperture. In addition, the optically transmissive plate is preferably thermally coupled to the common housing for cooling the plate. The common housing itself can be actively cooled, such as by flowing coolant through or around the housing.

BRIEF DESCRIPTION OF THE DRAWING FIGURES

DETAILED DESCRIPTION OF THE INVENTION

Figure 1:
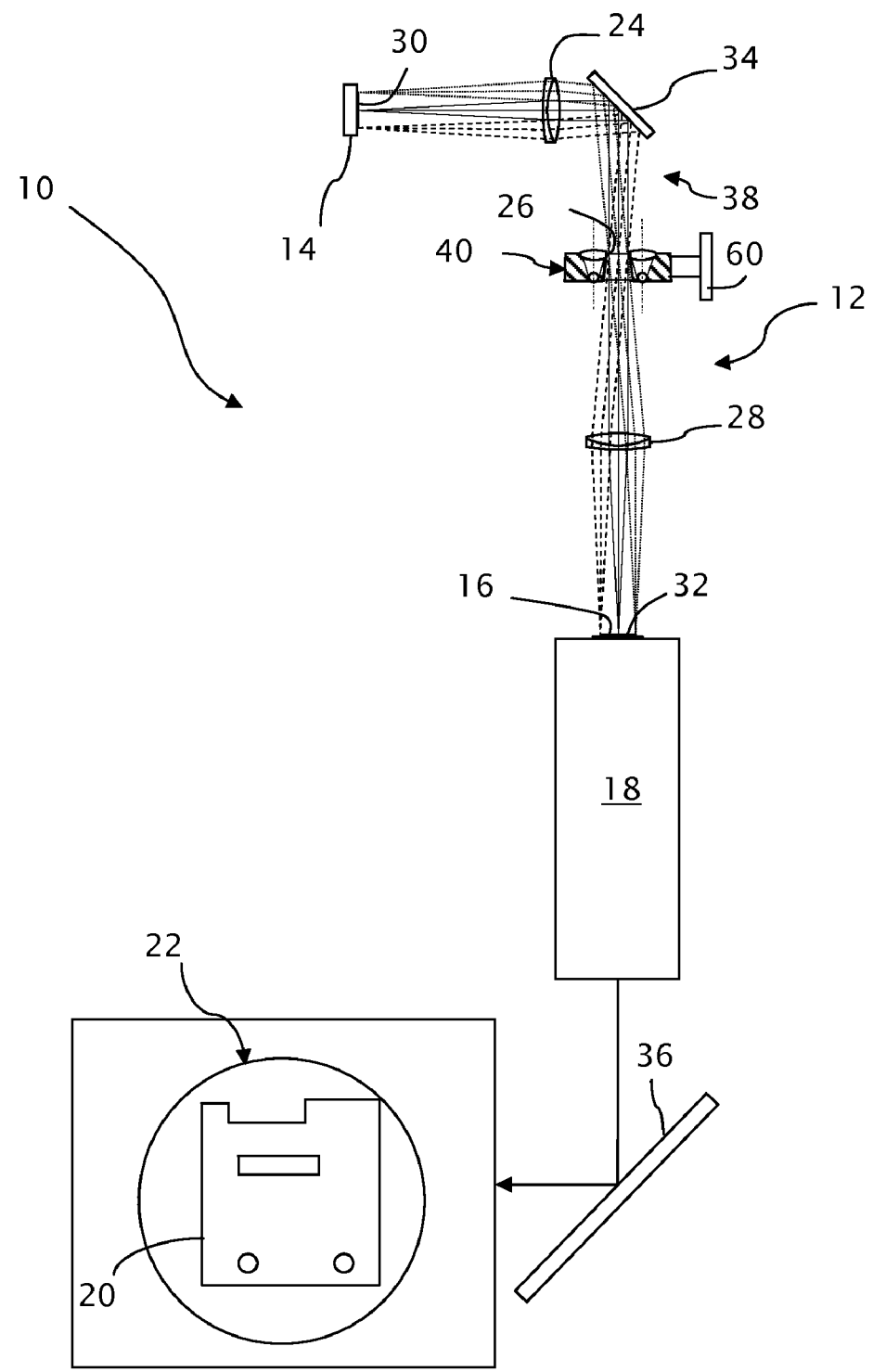
FIG. 1 is a diagram of an optical comparator showing imaging pathways of an imaging system from an object under inspection to a screen for comparing the object under inspection to a datum.

With reference to FIG. 1, an optical comparator 10, as an example of an optical inspection system in accordance with the invention, includes an objective 12 for forming an intermediate image 16 of an object 14 under inspection and a projector 18 for forming a magnified image 20 of the object 14 on a screen 22. The magnified image 20 can be compared to a datum, such as a template, for checking if the object 14 is within certain tolerances or taking other measurements. While the objective 12 can be regarded as an imaging system through the formation of the intermediate image 16, in a larger sense, the objective 12 combined with the projector 18, which together form the magnified image 20, constitutes a more complete imaging system of the comparator 10. Although not shown, the comparator 10 can include other conventional features (not shown) including one or more stages for mounting and moving the object 14, other illumination systems for bright-light or back-light illumination, gaging apparatus for measuring or otherwise comparing the object to a datum, and controls for the various comparator functions and for linking the comparator to other systems such as processing, work flow, or communications systems.

The objective 12 includes a front relay lens 24 and a rear relay lens 28 straddling an aperture stop 26, which is preferably located at the back focal plane of the front relay lens 24 and at the front focal plane of the rear relay lens 28. The front relay lens 24 collects light from an object field 30 in which the object 14 is located and the rear relay lens 28 forms the intermediate image 16 of the object 14 within an intermediate image field 32. The aperture stop 26 preferably constrains a range of field angles collected form the object field 30 so that the objective 12 is at least approximately telecentric for avoiding distortions of the intermediate image 16 accompanying variations in the focal depth of the object 14 throughout the object field 30. Preferably, the objective 12 has a one-to-one magnification and is doubly telecentric, i.e., telecentric at both the object field 30 and the intermediate image field 32.

The projector 18, which can provide various amounts of magnification, projects the intermediate image 16 onto the comparator screen 22. Fold mirror 34 within the objective 12 and fold mirror 36 between the projector 18 and screen 22 exemplify a redirection of imaging light within the comparator 10 for interconnecting locations convenient for mounting the object 14 and observing the magnified image 20 of the object 14.

Figure 2:
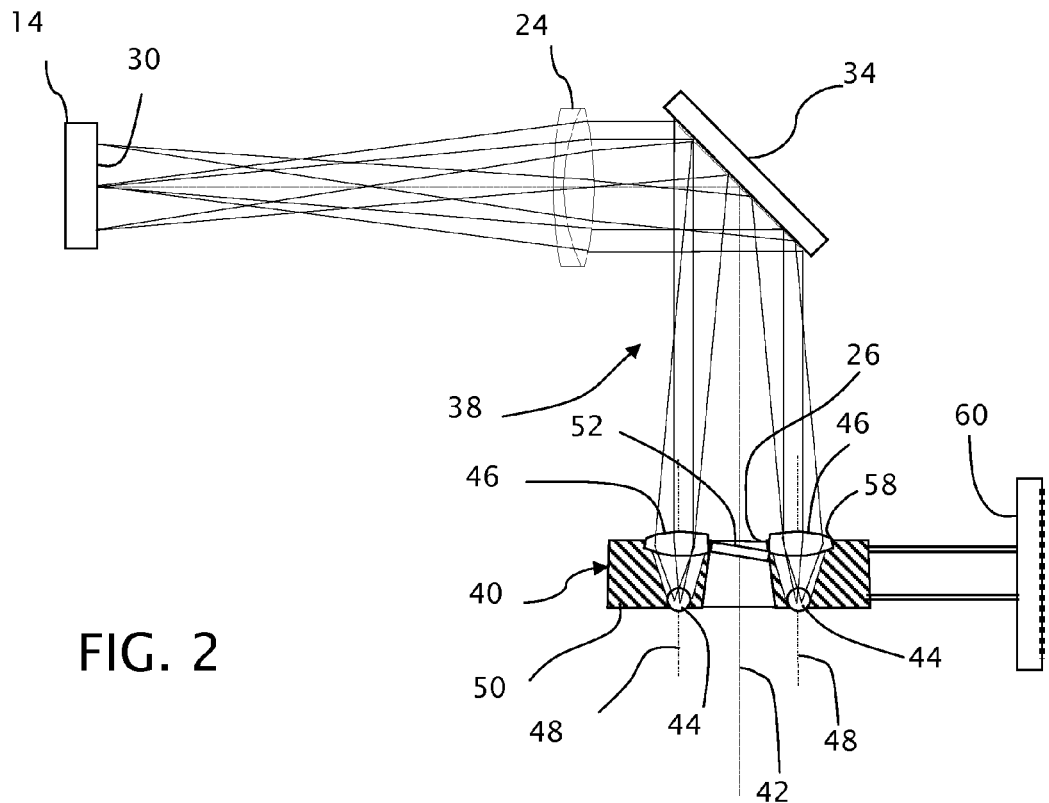
FIG. 2 is a diagram of a portion of the imaging system shared by an illumination system for illuminating the object under inspection showing illumination pathways from a multiplexed beam generator shown in cross section to the object.

A through-the-lens illumination system 38 in accordance with the invention includes a multiplexed beam generator 40 surrounding the objective aperture stop 26. The illustrated multiplexed beam generator 40, which is also shown by FIG. 2 and further enlarged in FIG. 3, includes four effective light sources 44 and associated four beam-shaping optics 46 all mounted within a common housing 50. A central aperture within the common housing 50 functions as the stop 26 of the objective 12. The exit faces of the beam-shaping optics 46 are preferably located in or near a plane containing the objective stop 26 so that the output of the beam-shaping optics 46 fills at least portions of an effective illuminator aperture stop 58 within the same plane. The four effective light sources 44 preferably comprise an equal number of light-emitting diodes (LEDs). The beam-shaping optics 46 preferably comprise collector or collimating lenses for converting output from the effective light sources 44 into an angular spread of beams for collectively illuminating the object field 30 through the front relay lens 24 of the objective 12.

The effective light sources 44 can be shaped and sized for achieving the desired angular spread of light beams through the beam-shaping optics 46 by combining the LEDs with respective diffusers (not shown) between the LEDs and collimating lenses. In the embodiment shown, the effective light sources 44 are aligned with axes 48 of the beam-shaping optic 46, and the axes of the beam-shaping optics are evenly distributed around an axis 42 of the objective 12 (which axis is also common to the illumination system 38). Preferably, the beam-shaping optics 46 are arranged in mirror symmetrical pairs for delivering balanced angular distributions of light across the object field 30.

Although shown as four (e.g., two pairs) of beam-shaping optics 46, more or less beam-shaping optics and associated light sources can be used (preferably in mirror symmetrical pairs). The beam-shaping optics preferably fill as much as possible of an annular periphery surrounding the aperture stop and are limited in overall radial dimension in accordance with a desired diameter of an effective illuminator aperture stop setting the maximum field angle for illuminating the object field 30.

Figure 3:
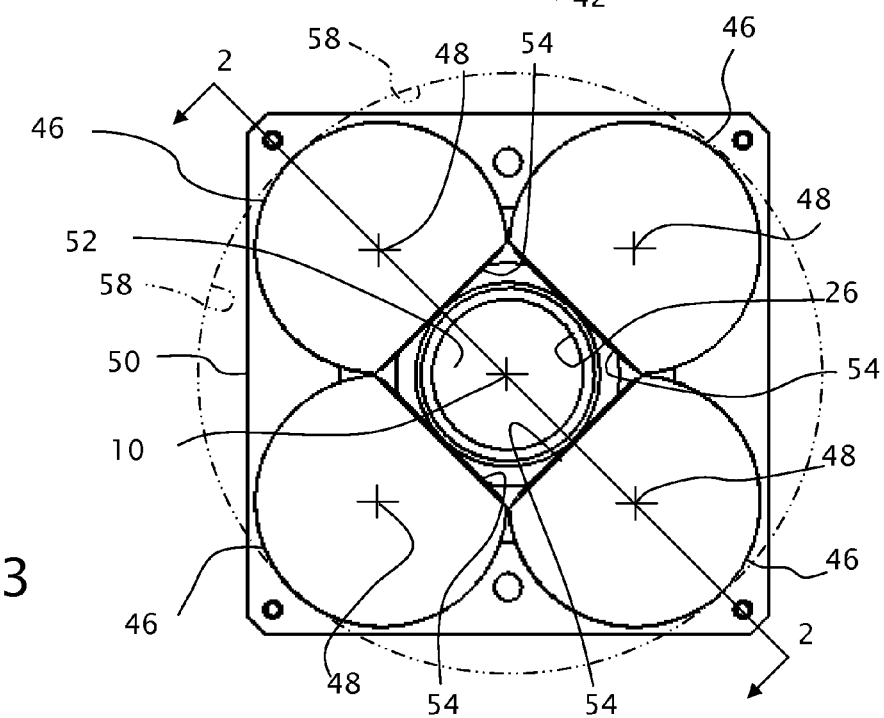
FIG. 3 is a relatively enlarged axial view of the multiplexed beam generator showing a distribution of beam-shaping optics surrounding an aperture stop of the imaging system.

As also shown in the illustrations of FIGS. 2 and 3, the beam-shaping optics 46 have peripheries that are truncated (see flats 54) adjacent to the objective stop 26, which allows the axes 48 of the beam-shaping optics 46 to be moved radially closer to the stop 26. The radial moves of the axes 48 through the amount the optics 46 are radially truncated allows more light from the beam-shaping optics 46 to pass through the front relay lens 24 while concentrating light within field angles closer to the field angles collected by the objective 12 for forming the intermediate image 32. The radially truncated form of the beam-shaping optics 46 effectively flattens a portion of an otherwise circular periphery, but other truncated shapes could also be used including concave shapes to more closely match the form of the objective stop 26.

The effective light sources 44 and associated beam-shaping optics 46 surrounding the objective stop 26 are referred to as a multiplexed beam generator because the spatial and angular contributions from each of the light sources 44 and associated beam-shaping optics 46 combine to illuminate at least partially overlapping portions of the object field 30 over a spread of field angles. The front relay lens 24 operating through a first effective numerical aperture collects light from the object field 30 through a range of field angles limited by the size of the objective stop 26. As a part of the illuminating system 38, the front relay lens 24 operates through a higher numerical aperture not limited by the objective stop 26 for conveying light to the object field 30 through a higher range of angles, which can be limited by either the aperture of the front relay lens 24 or the effective illuminator aperture 58 encompassing the beam-shaping optics 46. The truncated form (e.g., flats 54) of the beam-shaping optics 46, which moves the axes 48 of the beam-shaping optics 46 closer to the objective stop 26, allows more light to pass through the front relay lens 24 and concentrates the light within field angles that reach more of the object field 30.

The common housing 50 and its adaptations also reduce potentially undesirable effects from heat generated by the effective light sources 44 close to the imaging pathway of the comparator 10. For purposes of further isolating the effective light sources 44 and blocking heat convection along the optical axis 42 toward the front relay lens 24, an optically transmissive plate 52 is located within the central aperture of the housing 50 covering the aperture stop 26. Preferably, the optically transmissive plate 52, which can be made of optical glass, is mounted slightly tipped (e.g., the optical axis of the transmissive plate 52 is inclined to the objective axis 42 by approximately 10 degrees) to avoid producing spurious reflections along the imaging pathway from the object field 30 to the intermediate image field 32. Anti-reflective coatings can be applied to the plate to reduce reflections and enhance transmissivity. The plate 52 is preferably sealed to the central aperture of the common housing 50. Conventional sealing materials can be used for this purpose, such as room-temperature vulcanizing (RTV) silicones. The sealing material preferably (a) blocks heat flows around the plate 52, (b) provides a thermally conductive pathway between the plate 52 and the housing 50 to uniformize temperatures, and (c) provides a secure and steady mounting for the plate within the housing 50. The effective light sources 44, which are also mounted within the common housing 50, tend to transfer heat into the housing 50. A circulating cooling system 60 connected to the common housing 50 extracts the excess heat from the housing 50. For example, a coolant such as water can be circulated between the housing 50 and a heat exchanger. A fan (not shown) can also be used for conveying heat from the light sources 44.

Figure 4:
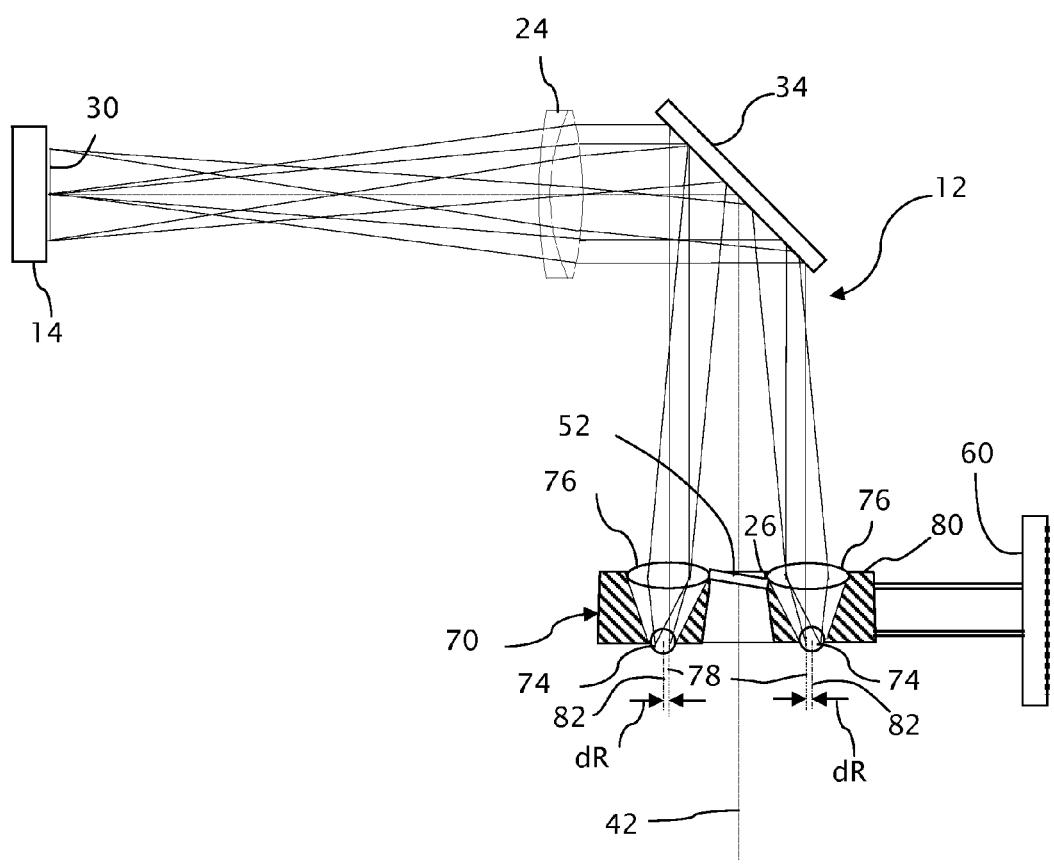
FIG. 4 is a diagram of an alternative illumination system for the optical comparator in which effective light sources are radially offset with respect to axes of beam-shaping optics within a modified multiplexed beam generator.

An alternative multiplexed beam generator 70 is shown in FIG. 4. Similar to the multiplexed beam generator 40, the multiplexed beam generator 70 includes a plurality of effective light sources 74 and associated beam-shaping optics 76 arranged within a common housing 80 in mirror symmetrical pairs (as is generally preferred) around the aperture stop 26 of the objective 12. However, instead of truncating the peripheries of the beam-shaping optics 76, the effective light sources 74 are radially displaced from axes 78 of the beam-shaping optics 76. Centerlines 82 of the effective sources are displaced radially outwardly from the axes 78 of the beam-shaping optics 76 through the distance dR.

The radial offset dR of the effective sources 74 concentrates light within a range of aperture angles (within the illumination aperture) prone to reaching the object field 30 through the front relay lens 24. The mirror symmetry between the effective sources 74 and associated beam-shaping optics 76 on opposite sides of the objective stop 26 provides for balancing illumination across the object field 30. That is, the object field positions disfavored by the effective sources 74 and associated beam-shaping optics 76 on one side of the objective stop 26 are favored by the mirror symmetrical effective sources 74 and associated beam-shaping optics 76 on the opposite side of the objective stop 26. The shapes and sizes of the effective light sources 74 are preferably limited in relation to the beam-shaping optics 76 for generating light beams through the range of aperture angles required for illuminating the object field 30 as imaged by the objective 12 or the projector 18. Preferably, the radial offset dR is limited to relatively increasing concentrations of light within certain of the aperture angles within the range required for illuminating the object field 30.

Figure 5:
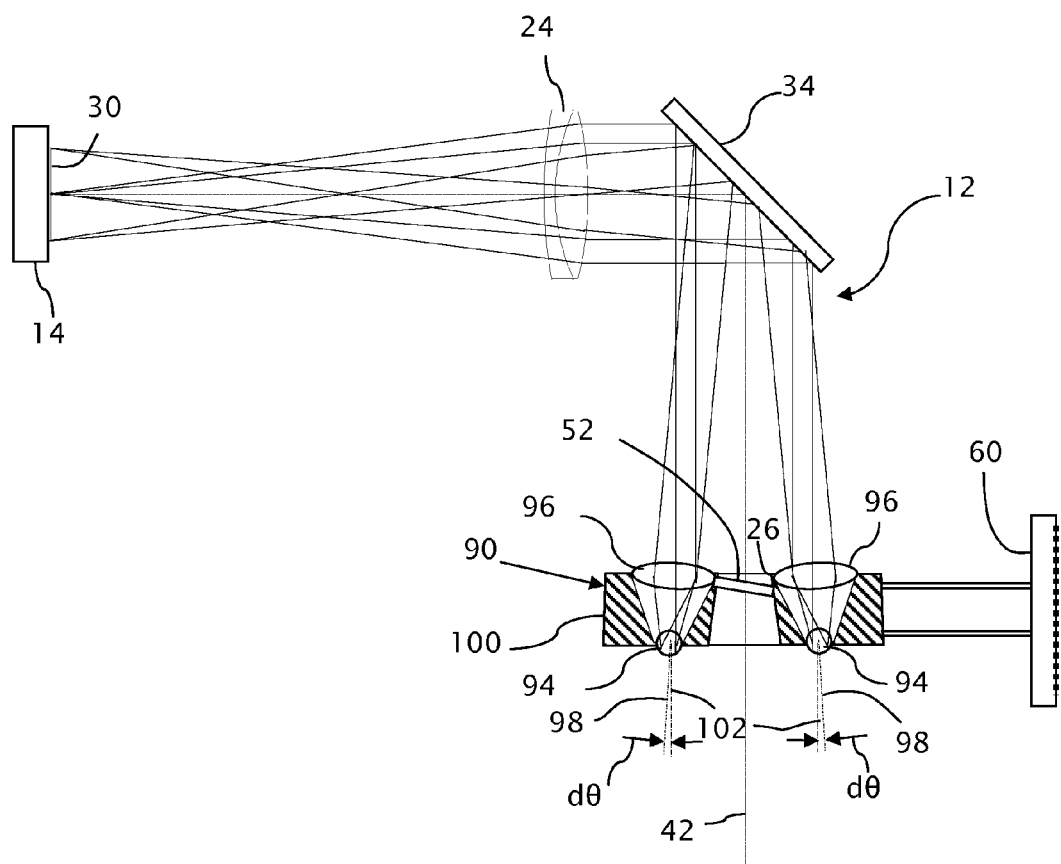
FIG. 5 is a diagram of another alternative illumination system for the optical comparator in which beam-shaping optics together with their associated effective light sources within a modified multiplexed beam generator are inclined toward a common axis of the imaging and illumination systems.

Another alternative multiplexed beam generator 90 is shown in FIG. 5. Here, a plurality of effective light sources 94 remain aligned with axes 98 of associated beam-shaping optics 96 within a common housing 100, but the axes 98 of the beam-shaping optics 96 are inclined to the objective optical axis 42 through an angular offset dθ (shown measured with respect to parallel axes 102) for concentrating light within aperture angles prone to reaching the object field 30 through the front relay lens 24. The inclinations of the axes 98 are preferably taken within axial planes that include the objective axis 42. Similar to the preceding embodiment, mirror symmetry is preferably provided between the effective sources 94 and associated beam-shaping optics 96 on opposite sides of the objective stop 26 for balancing illumination across the object field 30. Also similar to the preceding embodiment, the shapes and sizes of the effective light sources 94 are preferably limited in relation to the beam-shaping optics 96 for generating light beams through the range of aperture angles required for illuminating the object field 30 as imaged by the objective 12 or the projector 18. The angular offset dθ is limited to relatively increasing concentrations of light within certain of the aperture angles within the range required for illuminating the object field 30.

Various combinations of offsetting the effective light sources and inclining the beam-shaping optics can be used along with optimally sizing and shaping of the effective light sources to control distributions of light among aperture angles required for illuminating the imaged object field 30. In addition, the peripheries of the beam-shaping optics can be truncated to shift the inclined or relatively offset axes of the beam-shaping optics closer to the objective aperture for concentrating light within field angles that are closer to the field angles at which the object field 30 is imaged.

Although described with respect to an optical comparator, as an example of the invention's preferred use, the teachings of this invention are expected to apply in general to optical inspection systems with combined imaging and illumination systems, particularly where the minimum numerical aperture through which the illuminator operates is beyond the numerical aperture within which the imager operates.

The invention claimed is:

1. An illumination system for an optical inspection system including an objective for forming an image of an object under inspection comprising:
   a plurality of effective light sources and associated beam-shaping optics that are arranged for collecting light from the plurality of effective light sources and directing the light through a portion of the objective for illuminating the object;
   a common housing for the beam-shaping optics having a central aperture about which the beam-shaping optics are mounted and within which a stop of the objective is defined; and
   an optically transmissive plate located within the central aperture of the common housing for blocking transmissions of heat through the objective stop.

2. The illumination system of claim 1 in which the optically transmissive plate is inclined to avoid producing spurious images of the object.

3. The illumination system of claim 2 in which the optically transmissive plate has an optical axis that is inclined with respect to an optical axis of the objective by approximately 10 degrees.

4. The illumination system of claim 1 further comprising a seal between the optically transmissive plate and the common housing.

5. The illumination system of claim 1 in which the optically transmissive plate is thermally coupled to the common housing for cooling the plate.

6. The illumination system of claim 1 in which the common housing is actively cooled.

7. The illumination system of claim 1 in which
   the objective includes front and rear lenses straddling the objective stop,
   the front lens is arranged for collecting light from the object, and
   the plurality of effective light sources include light emitting diodes (LEDs) that are supported by the common housing in positions between the objective stop and the rear lens.

8. The illumination system of claim 7 in which a beam shaping optic is associated with each of the plurality of effective light sources.

9. The illumination system of claim 8 in which
   (a) the objective collects light scattered from the object through a first range of field angles and the plurality of effective light sources and associated beam-shaping optics are located in positions surrounding the objective stop for illuminating the object through a second range of higher field angles, and
   (b) the plurality of effective light sources and associated beam-shaping optics concentrate light among angles within the second range of field angles that are closer to angles within the first range of field angles for reducing angular variation among the field points illuminating the object.

10. The illumination system of claim 9 in which the second range of angles through which light is distributed from the beam-shaping optics includes angles at which the light both converges toward and diverges from an optical axis of the objective and the beam-shaping optics distribute more light into the angles that converge toward the optical axis.

* * * * *